US009613329B2

(12) United States Patent
Kamioka

(10) Patent No.: US 9,613,329 B2
(45) Date of Patent: Apr. 4, 2017

(54) MONITOR SYSTEM

(71) Applicant: CKD Corporation, Aichi (JP)

(72) Inventor: Yosuke Kamioka, Aichi (JP)

(73) Assignee: CKD Corporation, Aichi (JP)

( * ) Notice: Subject to any disclaimer, the term of this patent is extended or adjusted under 35 U.S.C. 154(b) by 0 days.

(21) Appl. No.: 14/952,732

(22) Filed: Nov. 25, 2015

(65) Prior Publication Data

US 2016/0078396 A1 Mar. 17, 2016

Related U.S. Application Data

(63) Continuation of application No. PCT/JP2014/061289, filed on Apr. 22, 2014.

(30) Foreign Application Priority Data

May 27, 2013 (JP) ................................. 2013-111124

(51) Int. Cl.
*H04W 4/02* (2009.01)
*G06Q 10/06* (2012.01)
*G06Q 50/04* (2012.01)
*G05B 23/02* (2006.01)
*G05B 19/418* (2006.01)
*G07C 3/08* (2006.01)

(52) U.S. Cl.
CPC ... *G06Q 10/063114* (2013.01); *G05B 19/418* (2013.01); *G05B 23/02* (2013.01);
(Continued)

(58) Field of Classification Search
CPC .. G05B 19/418; G05B 23/02; G05B 23/0208; G05B 23/0297; G06Q 10/063114;
(Continued)

(56) References Cited

U.S. PATENT DOCUMENTS 5,093,794 A * 3/1992 Howie ................... G06Q 10/06
700/100
6,417,760 B1 * 7/2002 Mabuchi .................. G07C 3/08
235/382

(Continued)

FOREIGN PATENT DOCUMENTS

| JP | 2009-205526 A | 9/2009 |
| JP | 2012-150787 A | 8/2012 |
| WO | 2005/009101 A1 | 1/2005 |

OTHER PUBLICATIONS

International Search Report issued in corresponding International Application No. PCT/JP2014/061289 mailed Jun. 17, 2014, and English translation thereof (2 pages).

(Continued)

*Primary Examiner* — Nathan Taylor
(74) *Attorney, Agent, or Firm* — Osha Liang LLP

(57) ABSTRACT

A monitor system for monitoring a status of one or more equipment includes a plurality of mobile terminals respectively operated by a plurality of operators. Each of the plurality of mobile terminals includes a communicator that receives status information with regard to the status of the equipment via a communication line; a display that displays, when the status according to the status information received from one of the mobile terminals indicates that the equipment requires a specified operation, information showing that the specified operation is required; and a territory setter that sets a territory in which one or more operations for the equipment to be performed by the operator of the each of the plurality of mobile terminals.

8 Claims, 9 Drawing Sheets

Operator B

(52) U.S. Cl.
CPC ..... *G05B 23/0208* (2013.01); *G05B 23/0297* (2013.01); *G06Q 50/04* (2013.01); *H04W 4/02* (2013.01); *G07C 3/08* (2013.01); *Y02P 90/04* (2015.11); *Y02P 90/14* (2015.11); *Y02P 90/30* (2015.11)

(58) Field of Classification Search
CPC . G06Q 50/04; G07C 3/08; H04W 4/02; Y02P 90/04; Y02P 90/14; Y02P 90/30
USPC ........... 455/456.1–456.3; 700/121, 100, 111; 340/679, 517
See application file for complete search history.

(56) References Cited

U.S. PATENT DOCUMENTS

| | | | | |
|---|---|---|---|---|
| 6,459,946 | B1* | 10/2002 | Villanova | ........ G05B 19/41865 700/108 |
| 2003/0098798 | A1* | 5/2003 | Kato | .................. G05B 23/0272 340/679 |
| 2004/0260518 | A1* | 12/2004 | Polz | ................... G05B 19/0423 702/188 |
| 2006/0200264 | A1* | 9/2006 | Kodama | ................ H05K 13/08 700/121 |
| 2010/0076604 | A1* | 3/2010 | Johnson | ............... G05B 19/042 700/275 |
| 2012/0161957 | A1* | 6/2012 | Ueno | ................. G05B 23/0224 340/517 |
| 2016/0041803 | A1* | 2/2016 | Markov | ............... A01B 69/001 701/48 |

OTHER PUBLICATIONS

Office Action dated Dec. 11, 2015 in corresponding Japanese Patent Application No. 2013-111124, with translation (4 pages).

* cited by examiner

Operator A

Operator B

MONITOR SYSTEM

TECHNICAL FIELD

The present invention relates generally to a monitor system, and more particularly relates to a monitor system using mobile terminals configured to monitor the status of equipment operating in a production field such as a plant.

BACKGROUND ART

A known monitor system uses mobile terminals to monitor the status of equipment operating in a production field such as a plant (for example, Patent Literature 1).

In this monitor system, a specified management device stores territories of respective operators. In the event of the occurrence of any problem such as an abnormality or shortage of a material in a certain equipment as a monitoring object, the specified management device selects a specific operator who is in charge of the certain equipment in the operator's territory as an operator who is to perform a specified operation to solve the problem and gives an instruction for the specified operation to a mobile terminal possessed by the specific operator.

CITATION LIST

Patent Literature

[Patent Literature 1] WO 2005/009101

SUMMARY OF THE INVENTION

The prior art technique, however, employs the centralized control system in which the management device allocates the respective operations based on the respective operators' territories stored in advance in the management device. The prior art technique is thus unlikely to flexibly respond to the status of the production field or the like changing momently due to various reasons.

The capacity of each operator (territory) changes momently, for example, when a certain operator needs to leave the operator's own position in the event of unexpected occurrence, when a certain operator has time to be in charge of another equipment due to smooth operation of equipment in the operator's own territory or an operation stop of the equipment in the territory because of some reason, or when a certain operator has difficulty in performing all the operations allocated to the operator on the occurrence of some trouble such as a failure that requires a long time to be solved.

The static configuration in which the management device allocates the respective operations based on the respective operators' territories stored in advance in the management device is likely to reduce the working efficiency and decrease the productivity.

One or more embodiments of the present invention provide a monitor system that ensures efficient operation and management of equipment and improves the productivity.

Various aspects that bring about an improvement in the conventional technique are described as follows. Functions and advantageous effects of the respective aspects are also described as appropriate.

Aspect 1: There is provided a monitor system that monitors a status of each of one or a plurality of equipment. The monitor system comprises one or a plurality of mobile terminals possessed by one or a plurality of operators. Each of the mobile terminals comprises a communicator that is configured to obtain at least status information with regard to the status of each of the equipment (for example, information on the working status, information on the remaining amount of material and information on the results of inspection) via a predetermined communication line; a display unit that is configured to, when at least the status of the equipment requires an operator's specified operation (for example, material supply operation, maintenance and inspection operation and checking operation of inspection object), display information showing a requirement for the specified operation; and a territory setter that is configured to set a territory of an operation (including, for example, a working area and a type of operation) to be performed by an operator who possesses the mobile terminal. When at least the specified operation is an operation included in the territory, the display unit displays the information showing the requirement for the specified operation in a predetermined configuration (for example, in a luminescent color) that allows the operator to recognize that the specified operation is included in the territory.

The "equipment" herein means any equipment involved in production of a product, for example, processing a material, assembling components and inspecting a product, in a production field such as a plant and includes production devices and inspection devices. The "status of equipment" includes, for example, a "failure" or "abnormality" in the equipment, "presence or absence of material" and "remaining amount of material".

According to the configuration of the aspect 1 described above, a certain operator is allowed to use the operator's own mobile terminal and set a territory of an operation to be performed by the operator. When the status of the equipment requires the operator's specified operation and the specified operation is the operation included in the territory, the information showing the requirement for the specified operation is displayed in the predetermined configuration on the mobile terminal possessed by the operator. For example, information regarding which material is insufficient in what device number of equipment and how much time is left until full consumption of the material may be displayed as an operation item in charge. Such display causes the operator to recognize the requirement for the specified operation.

Additionally, this configuration allows each operator to use the operator's own mobile terminal and set the territory of the operation to be performed by the operator. Compared with a conventional configuration that, for example, a management device allocates the respective operations based on the respective operators' territories stored in advance in the management device, this configuration enables each operator to understand the own status and the other operators' statuses and flexibly respond to the status of the production field or the like changing momently due to various reasons.

As a result, this ensures efficient operation and management of, for example, production equipment and improves the productivity.

Aspect 2: The monitor system described in the above aspect 1 may further comprise a territory setting canceller that is configured to exclude the specified operation included in the territory from the territory.

According to the configuration of the aspect 2 described above, each operator is allowed to use the operator's own mobile terminal and exclude a specific operation from the territory of the operation to be performed by the operator. In the event of unexpected occurrence, for example, this configuration allows the operator to exclude a specific operation included in the operator's own territory from this territory.

As a result, this further enhances the functions and the advantageous effects of the aspect 1 described above.

Aspect 3: In the monitor system described in either the above aspect 1 or aspect 2, the communicator may be configured to establish communication with another mobile terminal via the predetermined communication line. When a certain operator uses the operator's own mobile terminal to set at least a territory of an operation to be performed by the certain operator, information regarding the setting the territory of the operation may be sent as territory information to another mobile terminal possessed by another operator. Each of the mobile terminals may further comprise a territory identifier that is configured to determine whether there is any operation that does not belong to a territory of any operator, based on the territory information; and a provisional territory setter that is configured to, when there is any operation that does not belong to the territory of any operator, set the operation as a provisional territory of an operator who possesses the mobile terminal. When at least the specified operation is an operation included in the provisional territory, the display unit may display the information showing the requirement for the specified operation in a predetermined configuration (for example, in a luminescent color) that allows the operator to recognize that the specified operation is included in the provisional territory.

According to the configuration of the aspect 3 described above, when there is any operation that does not belong to the territory of any operator, an operation item regarding this operation is displayed on the mobile terminals of all the operators. This causes all the operators to recognize the requirement for this operation. This accordingly eliminates the likelihood of the occurrence of an operation that does not belong to the territory of any operator.

Aspect 4: In the monitor system described in any of the above aspects 1 to 3, the communicator may be configured to obtain only status information belonging to the territory (including provisional territory), out of the status information with regard to the status of each of the one or the plurality of equipment.

The aspect 4 described above simplifies the control process and the system configuration. As a result, this ensures efficient operation and management of, for example, production equipment and improves the productivity.

Aspect 5: In the monitor system described in any of the above aspects 1 to 4, the display unit may not display information that does not belong to the territory out of the information showing the requirement for the specified operation or may display the information that does not belong to the territory in a predetermined configuration (for example, gray out) that allows the operator to recognize that the information does not belong to the territory.

The configuration of the aspect 5 described above enables each operator to more clearly recognize the operator's own territory and reduces the likelihood of any error with regard to the territory. As a result, this ensures efficient operation and management of, for example, production equipment and improves the productivity.

In one or more embodiments of this invention, a monitor system for monitoring a status of one or more equipment comprises a plurality of mobile terminals respectively operated by a plurality of operators, wherein each of the plurality of mobile terminals comprises: a communicator that receives status information with regard to the status of the equipment via a communication line; a display that displays, when the status according to the status information received from one of the mobile terminals indicates that the equipment requires a specified operation, information showing that the specified operation is required; and a territory setter that sets a territory in which one or more operations for the equipment to be performed by the operator of the each of the plurality of mobile terminals, when the specified operation is to be performed in the territory, the display displays the information showing that the specified operation is required in the territory, the communicator establishes communication with another mobile terminal via the communication line, and when the operator of the each of the plurality of mobile terminals sets the territory, the communicator sends territory information representing the territory set by the operator to the other mobile terminal.

DETAILED DESCRIPTION OF THE INVENTION

Figure 1:
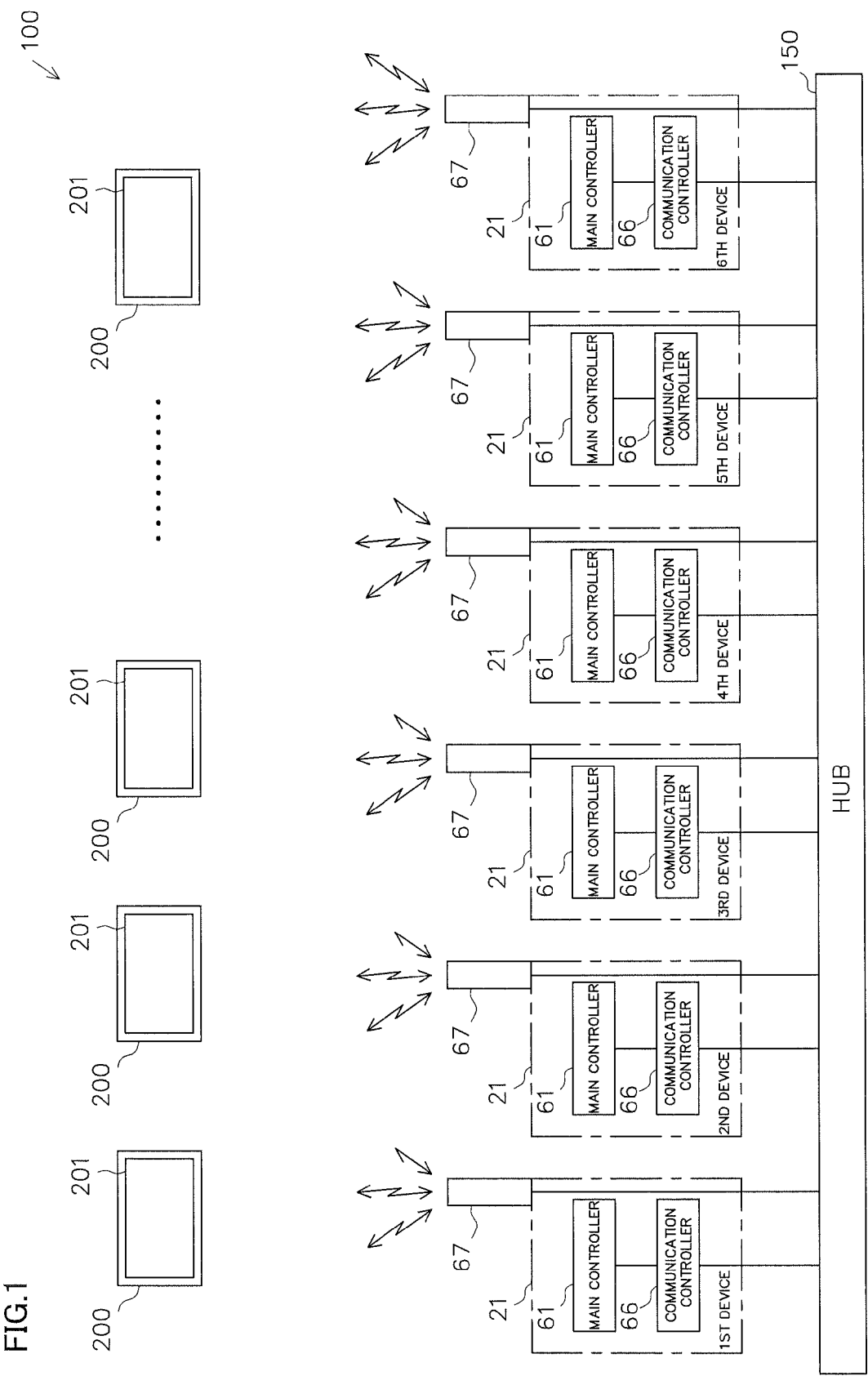
FIG. 1 is a configuration diagram illustrating the schematic configuration of a monitor system for inspection devices according to one or more embodiments of the present invention.
Figure 2:
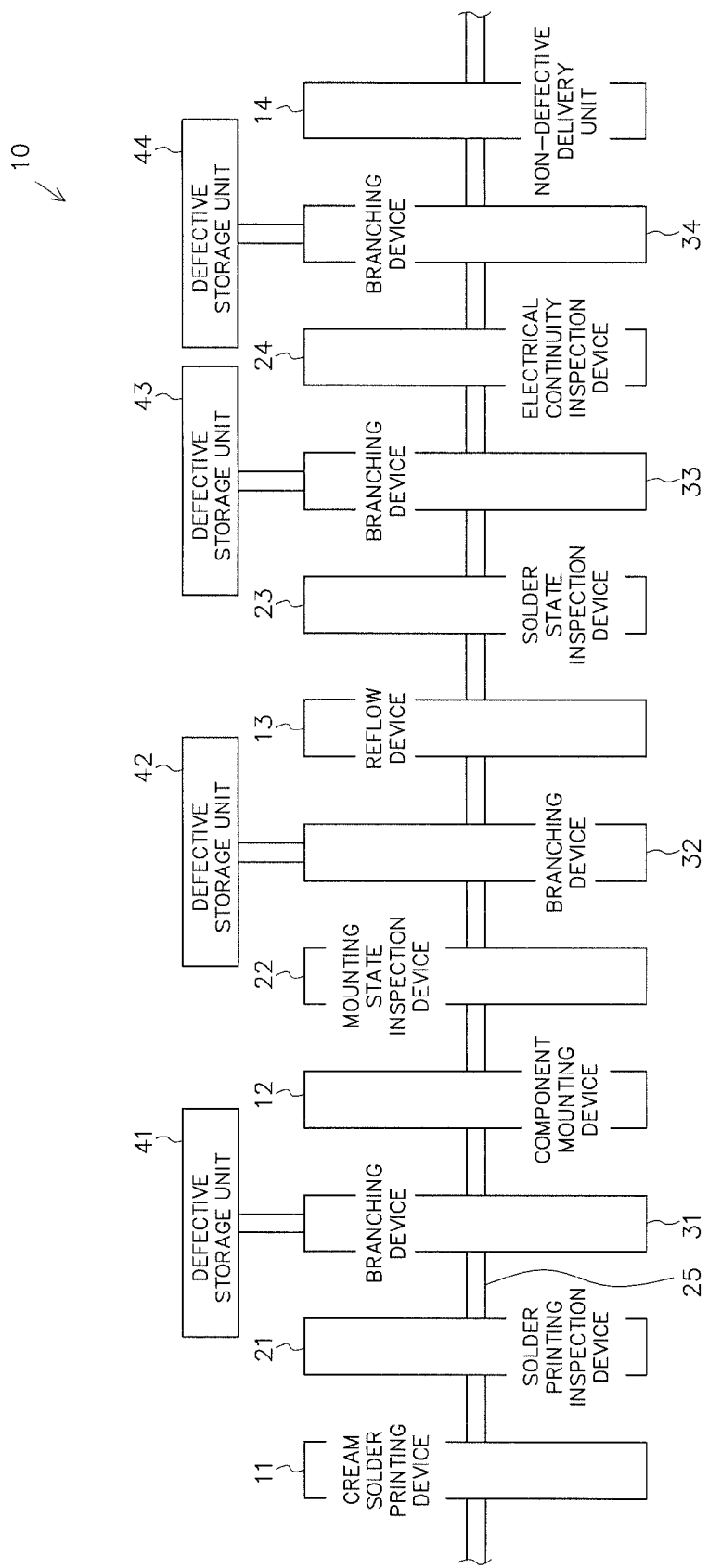
FIG. 2 is a configuration diagram illustrating the schematic configuration of a production line for printed circuit boards.
Figure 3:
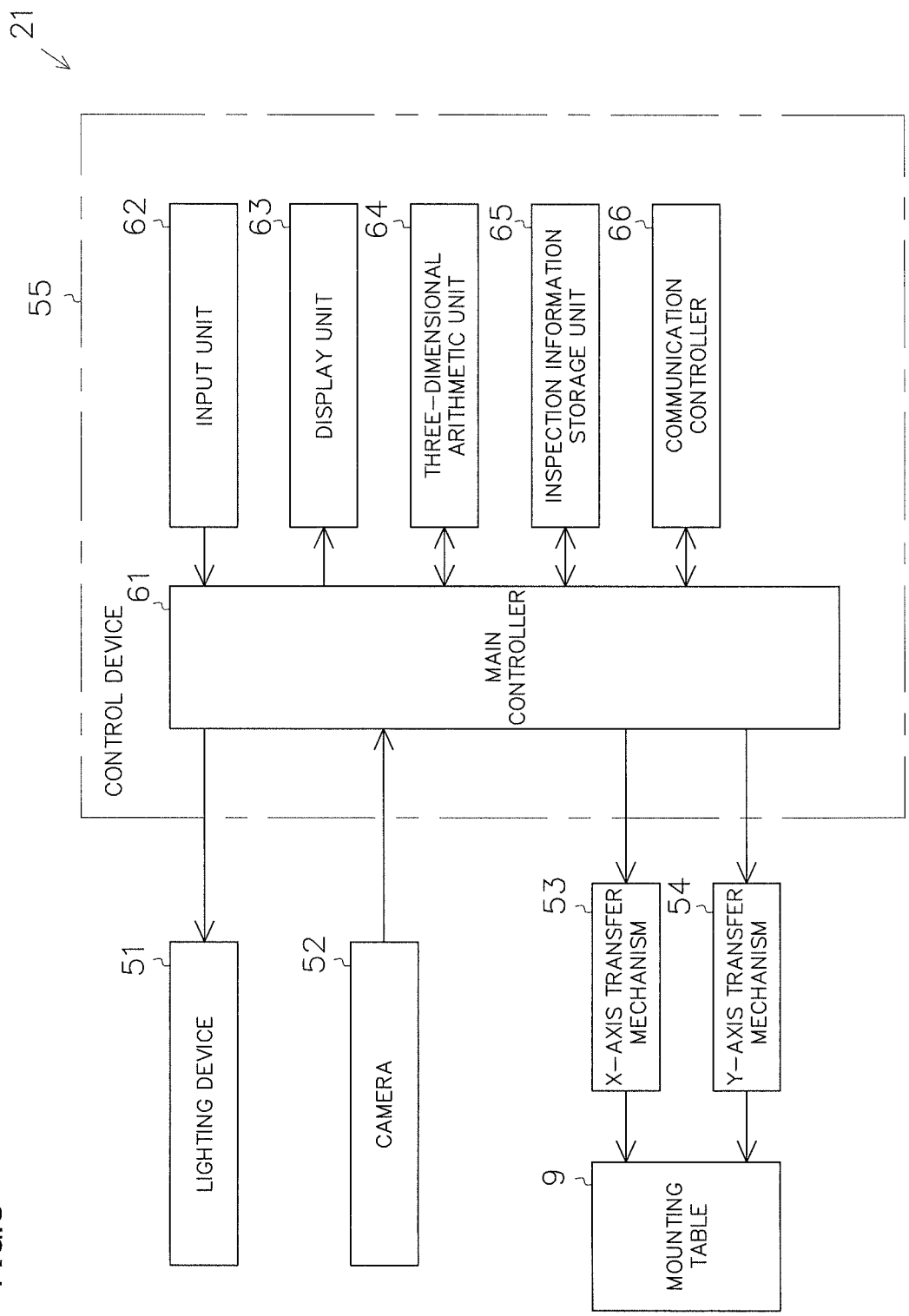
FIG. 3 is a configuration diagram illustrating the schematic configuration of a solder printing inspection device.

The following describes one embodiment with reference to drawings. FIG. 1 is a configuration diagram illustrating the schematic configuration of a monitor system 100 for inspection devices according to one or more embodiments of the present invention. FIG. 2 is a configuration diagram illustrating the schematic configuration of a production line 10 for printed circuit boards. FIG. 3 is a configuration diagram illustrating the schematic configuration of a solder printing inspection device 21 as an object to be monitored by the monitor system 100.

Prior to description of the monitor system 100, the following first describes the production line 10 for printed circuit boards.

As shown in FIG. 2, a cream solder printing device 11, a component mounting device 12 and a reflow device 13 are placed sequentially from its starting end (left side of FIG. 2) in the production line 10.

Figure 10:
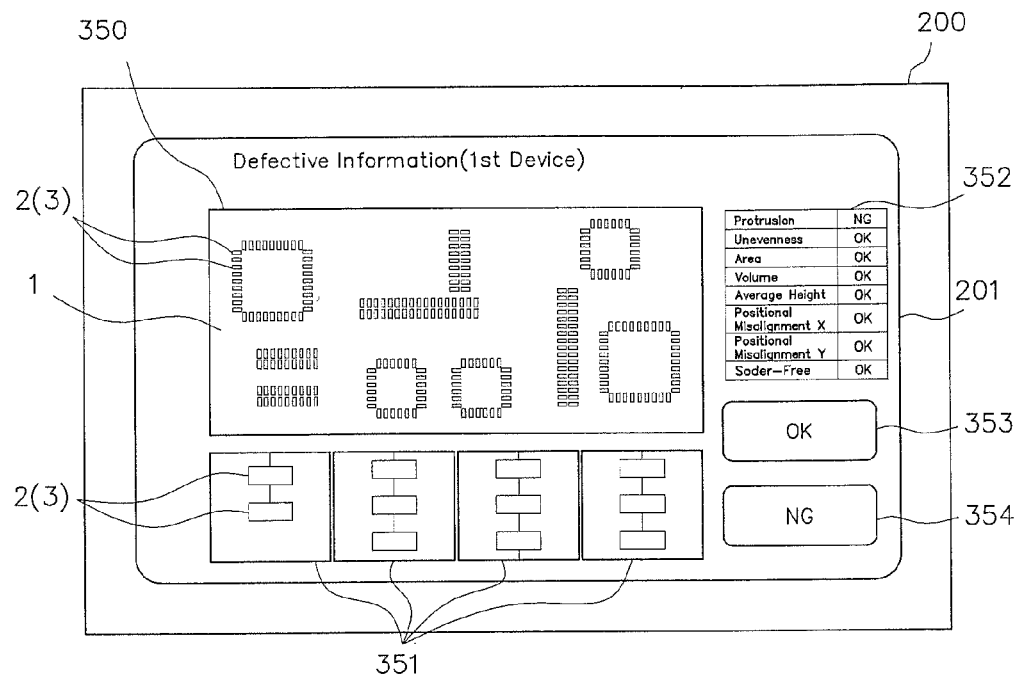
FIG. 10 is a diagram illustrating one exemplary display configuration of a "Defective Information" window on the display unit of the mobile terminal according to one or more embodiments of the present invention.

The cream solder printing device 11 is configured to print a predetermined amount of cream solder 3 on each land (pad) 2 provided on a printed circuit board 1 (as shown in FIG. 10). According to this embodiment, the printed circuit board 1 corresponds to the inspection object.

The component mounting device 12 is configured to mount electronic components such as chip on the printed cream solder 3.

The reflow device 13 is configured to heat and fuse the cream solder 3 and solder-join (solder) each of the lands 2 with (to) an electrode or lead of each electronic component.

The basic configurations of these devices 11 to 13 are known in the art and are not specifically described herein.

A solder printing inspection device 21 configured to check the conditions (for example, printing position, height and quantity) of the printed cream solder 3 is placed in the downstream of the cream solder printing device 11. A branching device 31 is provided between the solder printing inspection device 21 and the component mounting device 12. The printed circuit board 1 determined as non-defective by the solder printing inspection device 21 is guided to the component mounting device 12 on the downstream side, while the printed circuit board 1 determined as defective is, on the other hand, discharged to a defective storage unit 41. According to this embodiment, the branching device 31 corresponds to the discharge unit.

A mounting state inspection device 22 configured to check the state of each mounted electronic component is placed in the downstream of the component mounting device 12. A branching device 32 is provided between the mounting state inspection device 22 and the reflow device 13. The printed circuit board 1 determined as non-defective by the mounting state inspection device 22 is guided to the reflow device 13 on the downstream side, while the printed circuit board 1 determined as defective is, on the other hand, discharged to a defective storage unit 42.

A soldering state inspection device 23 configured to check whether the state of soldering after reflow is adequate and an electrical continuity inspection device 24 configured to check whether electrical continuity after soldering is adequately provided are placed in the downstream of the reflow device 13. Branching devices 33 and 34 are respectively provided in the downstream of these inspection devices 23 and 24. The printed circuit board 1 determined as non-defective by both the respective inspection devices 23 and 24 is guided to a non-defective delivery unit 14 on the downstream side, while the printed circuit board 1 determined as defective is, on the other hand, guided to a corresponding defective storage unit 43 or 44.

A conveyor 25 or the like is additionally provided on the production line 10 as the transfer unit to transfer the printed circuit board 1 between the respective devices described above.

The following describes, in detail, the configuration of the solder printing inspection device 21 to be monitored by the monitor system 100. As shown in FIG. 3, the solder printing inspection device 21 includes a mounting table 9 on which the printed circuit board 1 is mounted, a lighting device 51 provided as the "irradiation unit" to irradiate the surface of the printed circuit board 1 obliquely downward with a specified light component pattern, a camera 52 provided as the "imaging unit" to take an image of the printed circuit board 1 irradiated with the light component pattern, and a control device 55 configured to perform various controls, image processing and arithmetic operations in the solder printing inspection device 21.

The solder printing inspection device 21 may comprise an X-axis transfer mechanism 53 and a Y-axis transfer mechanism 54 to move the mounting table 9. Operating the X-axis transfer mechanism 53 and the Y-axis transfer mechanism 54 slides and moves the mounting table 9 on which the printed circuit board 1 is mounted, in an X-axis direction and in a Y-axis direction. This enables the printed circuit board 1 to be moved in any arbitrary direction (X-axis direction and Y-axis direction).

As the conveyance unit for conveying the printed circuit board 1, the mounting table 9 may comprise, for example, a pair of conveyor belts configured to support both sides of the printed circuit board 1 and convey the printed circuit board 1 in a predetermined direction, a pair of rails configured to support the respective conveyor belts in a rotatable manner and a motor configured to drive the conveyor belts.

According to the above configuration, the printed circuit board 1 conveyed from the upstream to the solder printing inspection device 21 and guided onto the mounting table 9 is guided to a predetermined position by rotation of the conveyor belts and is pressed by a chuck or the like to be located at a specified position on the mounting table 9. After inspection, the printed circuit board 1 is released from the press by the chuck or the like and is conveyed by rotation of the conveyor belts to the downstream of the solder printing inspection device 21.

The configuration of the mounting table 9 is not limited to the configuration described above but may be another configuration.

The control device 55 includes a main controller 61 configured to control the entire solder printing inspection device 21, an input unit 62 comprised of, for example, a keyboard, a mouse and a touch panel, a display unit 63 configured to have a display screen such as CRT or liquid crystal display, a three-dimensional arithmetic unit 64 configured to perform three-dimensional measurement of the cream solder 3 based on, for example, image data obtained by the camera 52, an inspection information storage unit 65 configured to store inspection information such as obtained image data and results of the three-dimensional measurement, and a communication controller (communication interface) 66 provided as the communicator to control communications such as receiving and sending various pieces of information.

The main controller 61 is implemented by a computer including a CPU, a ROM, a RAM, I/O interfaces and a free run counter, and the respective units 62 to 66 described above are electrically connected with the main controller 61.

The following subsequently describes an inspection procedure by the solder printing inspection device 21. In the solder printing inspection device 21, when the printed circuit board 1 is set at the specified position, a predetermine site on the printed circuit board 1 is irradiated with the light component pattern emitted from the lighting device 51 and an image of the predetermined site on the printed circuit board 1 irradiated with the light component pattern is taken by the camera 52, in response to an instruction from the main controller 61.

Such image-taking is performed for each inspection area unit set on the printed circuit board 1. The image of the entire printed circuit board 1 is taken by sequentially moving the printed circuit board 1 by the above transfer mechanisms 53 and 54.

Image data obtained by the camera 52 is converted into a digital signal in the camera 52, is input in the form of digital signal into the main controller 61 and is stored in the inspection information storage unit 65.

The three-dimensional arithmetic unit 64 performs three-dimensional measurement, based on the image data stored in the inspection information storage unit 65. According to this embodiment, for example, the main controller 61, the lighting device 51, the camera 52 and the three-dimensional arithmetic unit 64 constitute the inspector.

According to this embodiment, for example, the heights (peak height and average height), the volume and the three-dimensional shape of the cream solder 3 printed on the printed circuit board 1 are measured. This embodiment employs the phase shifting method for the three-dimensional measurement, but any other suitable measurement technique such as light section method, spatial coding method or focusing method may be employed instead.

The results of measurement are stored in the inspection information storage unit 65, and the main controller 61 performs defective/non-defective determination based on the results of measurement. According to this embodiment, the main controller 61 corresponds to the defective/non-defective determiner.

For example, the main controller 61 compares with the results of measurement stored in the inspection information storage unit 65 with reference data stored in advance and performs defective/non-defective determination of the printing state of the cream solder 3 with regard to each of the lands 2 on the printed circuit board 1 (including a solder bridge or the like formed between a plurality of lands).

Inspection items set according to this embodiment include, for example, whether the "protrusion (peak height)" is within a reference range, whether any "unevenness" of soldering is found, whether the "area" is within a reference range, whether the "volume" is within a reference range, whether the "average height" is within a reference range, whether "positional misalignment" in the X-axis direction is within a reference range, whether "positional misalignment" in the Y-axis direction is within a reference range, whether any "solder-free" area without the cream solder 3 is found. The inspection items are, however, not limited to those of this embodiment but may be set arbitrarily.

The main controller 61 determines the printing state as "non-defective (OK)" or as "defective (NG)" with respect to each of the lands 2 and each of the inspection items. When the printing state of the cream solder 3 is determined as non-defective with regard to all the lands 2 on a printed circuit board 1, the printed circuit board 1 is determined as "non-defective (OK)". When any of the individual defective/non-defective determinations of a printed circuit board 1 (with regard to the respective lands 2 and the respective inspection items) gives a "defective (NG)" result, on the other hand, the printed circuit board 1 is determined as "defective (NG)".

The main controller 61 subsequently stores the results of determination with regard to a printed circuit board 1 subjected to the above defective/non-defective determination (including the results of determination with regard to the respective lands 2 and the respective inspection items), along with the image data and the results of measurement of the printed circuit board 1, into the inspection information storage unit 65. At the same time, the main controller 61 performs an update process of updating production management information to grasp its own production status.

For example, in response to determination as non-defective, the main controller 61 increments the value of a non-defective count number stored in its own memory or the like by one and updates the setting of a working status flag for determining its own working status to a value "0" representing "during production".

In response to determination as defective, on the other hand, the main controller 61 increments the value of a defective count number stored in its own memory or the like by one and updates the setting of the above working status flag to a value "1" representing "temporary stop".

In the event of the occurrence of any abnormality such as failure in the solder printing inspection device 21, the main controller updates the setting of the above working status flag to a value "2" representing "occurrence of abnormality".

Subsequently the main controller 61 takes into account the setting of the above working status flag and temporarily stops the solder printing inspection device 21 by, for example, temporarily suspending the carry-out operation of the printed circuit board 1 by means of the mounting table 9 when the setting of the working status flag is the value "1" representing "temporary stop" or the value "2" representing "occurrence of abnormality". According to this embodiment, this function corresponds to the temporary stopper. Additionally, a tower light 67 described later may be lit on to inform of the occurrence of a defective.

In the case of a defective result given by the above defective/non-defective determination or in the case of the occurrence of any abnormality such as failure, after updating the production management information as described above, the main controller 61 sends the updated production management information (for example, temporary stop information or abnormality information) via the communication controller 66 to a mobile terminal 200 of a person in charge (including temporary person in charge) as described later in detail. This quickly notifies the mobile terminal 200 of the person in charge of the temporary stop of the solder printing inspection device 21 (the occurrence of a defective) or the occurrence of an abnormality such as failure in the solder printing inspection device 21, without waiting for a request for sending the production management information from the mobile terminal 200 as the routine in the ordinary state.

The following subsequently describes the monitor system 100 in detail. In a plant under management of the monitor system 100, a plurality of the above production lines 10 are placed, and the solder printing inspection device 21 described above is provided for each of the production lines 10.

According to this embodiment, six production lines 10 from first line to sixth line are provided, and six solder printing inspection devices 21 from No. 1 device to No. 6 device are provided to be monitored by the monitor system 100. The number of the solder printing inspection devices 21 (production lines 10) as the objects to be monitored by the monitor system 100 is, however, not limited to the number of this embodiment. The monitoring object may be, for example, only one solder printing inspection device 21 (single production line 10).

As shown in FIG. 1, each of the solder printing inspection devices 21 has a tower light 67, in addition to the above configuration. The tower light 67 is configured to notify of the defective result of determination or the occurrence of any abnormality by lighting or buzzer sound.

Additionally, the tower light 67 according to one or more embodiments of the invention serves as an access point (antenna device) configured to send and receive radio waves between the above communication controller 66 and the mobile terminal 200 described later and between a plurality of mobile terminals 200.

The tower light 67 of this embodiment is independently provided from the main body of the solder printing inspection device 21 and may thus be externally attached to and electrically connected with the solder printing inspection device 21. This facilitates introduction of the monitor system 100 to the existing production line 10.

The communication controller 66 and the tower light 67 of each of the solder printing inspection devices 21 are respectively connected to a hub 150 by means of LAN (local area network) cables, so as to provide a wired LAN.

A wireless LAN for wireless communication is provided between the tower light 67 and the mobile terminal 200. The wired LAN and the wireless LAN constitute an in-plant LAN. According to this embodiment, the in-plant LAN corresponds to the communication line.

The communication controller 66 serves to send various pieces of information output from the main controller 61 to each of the mobile terminals 200 via the tower light 67 and input various pieces of information received from each of the mobile terminals 200 to the main controller 61.

The coverage of the tower light 67 of each solder printing inspection device 21 to allow radio waves to be sent to and received from the mobile terminal 200 is limited to a predefined area around the tower light 67. When the communication controller 66 of each solder printing inspection device 21 fails to find any mobile terminal 200 as the sending/receiving object in the predefined area of the tower light 67 of its own solder printing inspection device 21, the communication controller 66 sends and receives data via the tower light 67 of another solder printing inspection device 21 that has an area receivable from and transmittable to the mobile terminal 200.

The tower light 67 has the function of relaying data sending/receiving between a plurality of mobile terminals 200 described above. For example, in the case of data transmission from a mobile terminal 200A of an operator A to a mobile terminal 200B of another operator B, the data is transmitted from the mobile terminal 200A of the operator A through a first tower light 67, the hub 150, a second tower light 67 to the mobile terminal 200B of the operator B.

The following describes the mobile terminal 200. According to this embodiment, an existing smartphone or tablet PC may be used as the mobile terminal 200.

Although not being illustrated, the mobile terminal 200 includes a controller comprised of, for example, a CPU that performs various arithmetic operations, a memory comprised of, for example, a ROM that stores programs and the like and a RAM that temporarily stores various data, and a communication processor provided as the communicator to send and receive various data via the tower light 67.

The mobile terminal 200 has a display unit 201 configured to display various pieces of information. The display unit 201 is implemented by a so-called touch panel and serves as both the display unit and the input unit.

The following describes the operations of the monitor system 100 having the above configuration in detail.

The main controller 61 of each solder printing inspection device 21 placed in the plant grasps its own production status or the like at regular intervals (in this embodiment, every time inspection of one printed circuit board 1 is completed) as described above and updates and stores information relating to the production status or the like as production management information in its own memory or the like.

According to this embodiment, the production management information stored may include, for example, "production number (non-defective count number)" showing the number of non-defective printed circuit boards 1, "NG number (defective count number)" showing the number of defectives, and the setting of the working status flag showing the own working status (for example, "during production (in operation)", "temporary stop" or "occurrence of abnormality").

A plurality of operators is involved in monitoring the production lines 10 in the plant (for example, a production room where the production lines 10 are placed, or a monitor room where the operators stand by). Each of the operators possesses one mobile terminal 200.

When the operator activates software (application) installed in advance in the mobile terminal 200, a predetermined menu window (not shown) is displayed on the display unit 201 of the mobile terminal 200.

Figure 4:
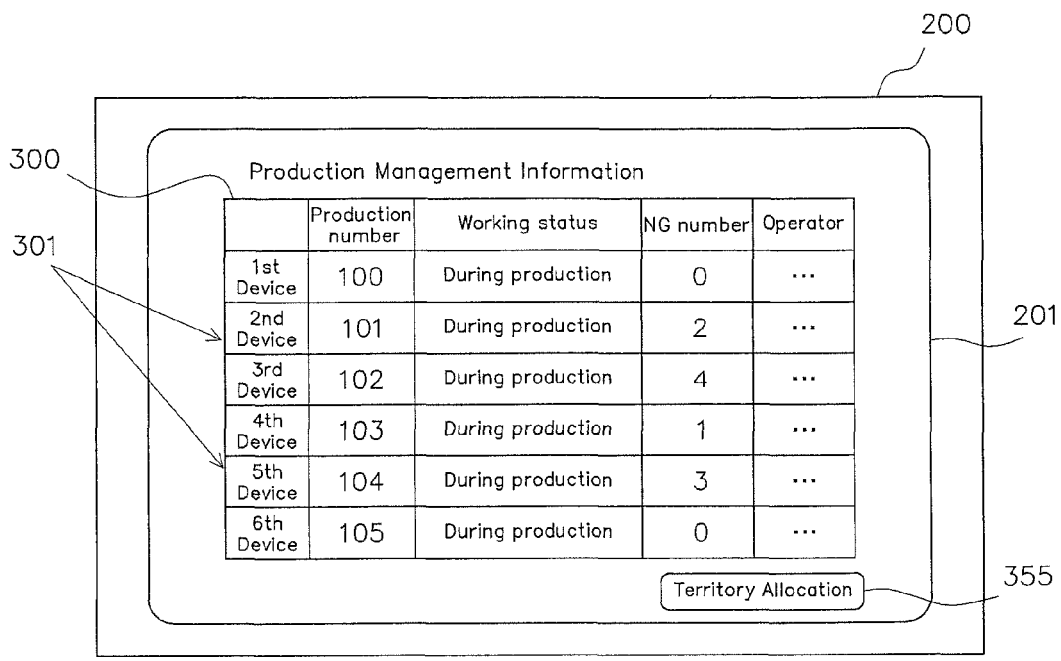
FIG. 4 is a diagram illustrating one exemplary display configuration of a "Production Management Information" on a display unit of a mobile terminal according to one or more embodiments of the present invention.

In response to the operator's subsequent press of a "Production Management" button displayed on the menu window, a "Production Management Information" window as shown in FIG. 4 is opened. The "button" herein means an icon representing a button on the display unit 201 (the same applies hereinafter).

In response to a press of the "Production Management" button, the mobile terminal 200 sends a data request signal for requesting the production management information described above via the in-plant LAN to the main controller 61 of each solder printing inspection device 21. When receiving the data request signal, the main controller 61 of each solder printing inspection device 21 sends back the above production management information to the mobile terminal 200 as the source that has sent the request signal.

When receiving the production management information from each solder printing inspection device 21, the mobile terminal 200 stores the received production management information into the memory. Accordingly, the production management information with regard to the six solder printing inspection devices 21 is stored in the memory of each mobile terminal 200.

Afterwards, the mobile terminal 200 sends the above data request signal to each solder printing inspection device 21 at predetermined time intervals (for example, at the internals of every 30 seconds) as the background process, obtains new production management information and stores the obtained production management information in the memory. This updates the production management information stored in the memory of the mobile terminal 200 to the latest data at the predetermined time intervals.

As described later, however, when a territory in charge (including provisional territory) is specified, the mobile terminal 200 sends the above data request signal to only the solder printing inspection devices 21 included in the territory in charge (for example, $1^{st}$ device and $2^{nd}$ device) and obtains the production management information of only these solder printing inspection devices 21.

When the setting of the above working status flag is the value "1" representing "temporary stop", i.e., on the occurrence of a defective, the main controller 61 sends the results of determination with regard to the printed circuit board 1 determined as defective (including the results of determination with regard to the respective lands 2 and the respective inspection items) as well as the image data and the results of measurement with regard to the printed circuit board 1, along with the above production management information, to the mobile terminal 200.

A working status list 300 is then shown in the "Production Management Information" window of the mobile terminal 200, based on the above production management information. The working status list 300 has six display fields 301 corresponding to the individual $1^{st}$ to $6^{th}$ solder printing inspection devices 21.

Each of the display fields 301 corresponding to each solder printing inspection device 21 shows "device number" allocated to the solder printing inspection device 21, "production number" of the printed circuit boards 1, "working status" of the solder printing inspection device 21, "NG number" of the printed circuit boards 1 and "name of person in charge (operator)" who is in charge of various operations, based on the above production management information.

The "name of person in charge" displayed is the name of the operator (current operator) registered in relation to device-specific information of the mobile terminal 200 (for example, ID or MAC address). Showing the name of person in charge in the working status list 300 allows each operator to grasp which operator is in charge of what operation and facilitates the operator's selection of the operation which the operator is to be in charge, thus improving the operability.

In some cases, different operators may use one identical mobile terminal 200 according to the work shift. Showing only the device-specific information of the mobile terminal 200 may result in a failure in identifying the person who is actually in charge of operation. The configuration of this embodiment, however, shows the name of person in charge in the display field 301 and thus more accurately provides information on the operator who is actually in charge of each solder printing inspection device 21.

The following describes, in detail, the operating procedure of the mobile terminal 200 and its relevant displays when each operator sets the own territory in charge, with reference to drawings. According to this embodiment, the function to perform the following series of processing corresponds to the territory setter.

A "Territory Allocation" button 355 is displayed together with the working status list 300 in the "Production Management Information" window of the mobile terminal 200 shown in FIG. 4.

Figure 5:
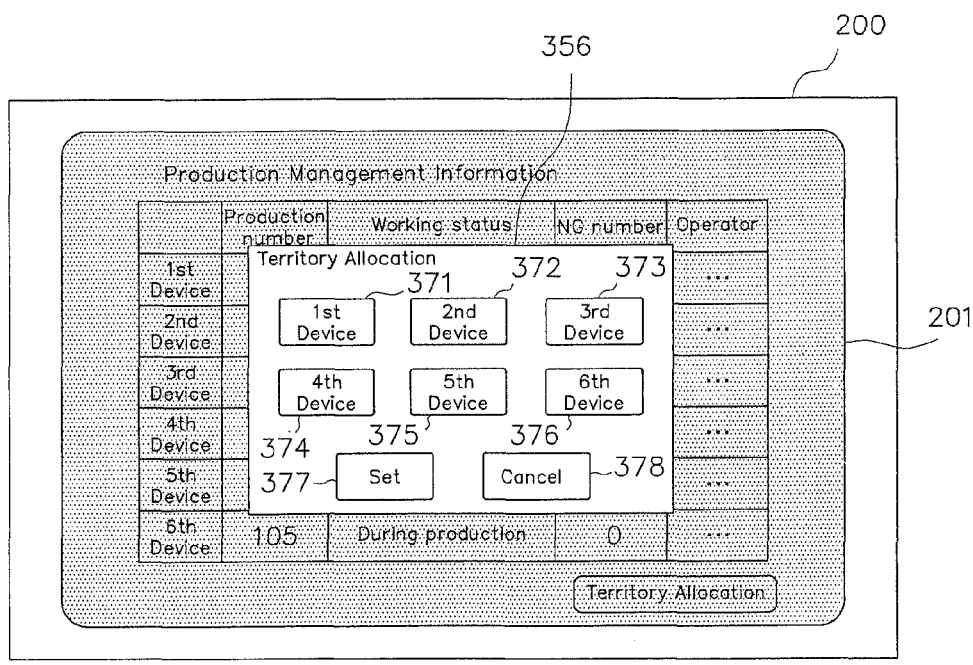
FIG. 5 is a diagram illustrating one exemplary display configuration of a "Territory Allocation" window on the display unit of the mobile terminal according to one or more embodiments of the present invention.

In response to the operator's press of the "Territory Allocation" button 355, a "Territory Allocation" window 356 as shown in FIG. 5 is pop-up displayed over the "Production Management Information" window on the display unit 201 of the mobile terminal 200.

The "Territory Allocation" window 356 shows six option buttons 371 to 376 corresponding to the individual 1st to 6th solder printing inspection devices 21. For example, the "Territory Allocation" window 356 includes a "$1^{st}$ Device" option button 371, a "$2^{nd}$ Device" option button 372, a "$3^{rd}$ Device" option button 373, a "4th Device" option button 374, a "$5^{th}$ Device" option button 375 and a "$6^{th}$ Device" option button 376.

The "Territory Allocation" window 356 also shows a "Set" button 377 and a "Cancel" button 378, in addition to the option buttons 371 to 376.

Figure 6:
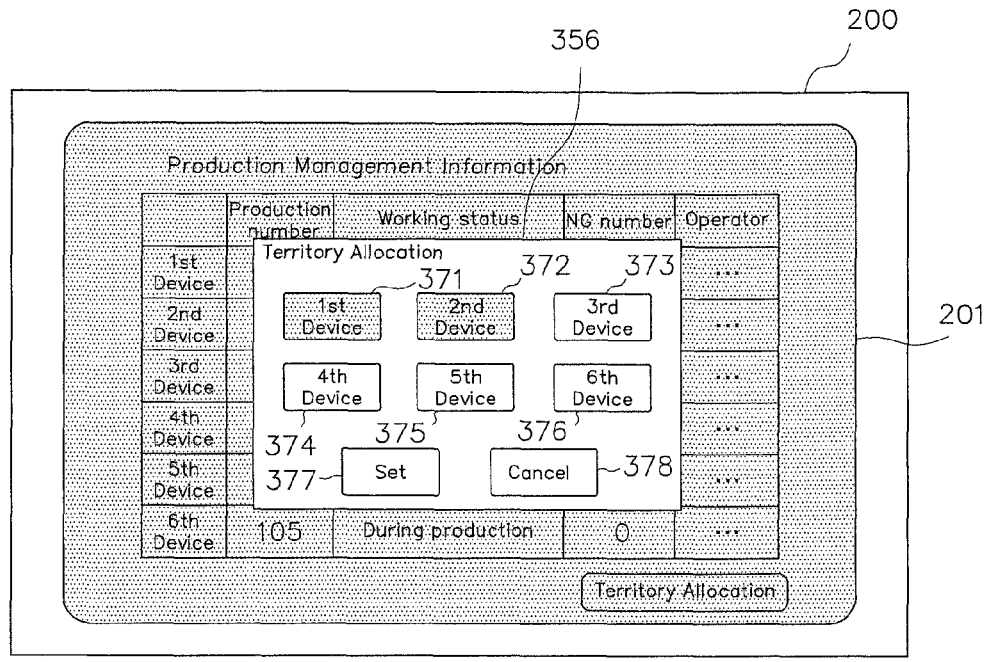
FIG. 6 is a diagram illustrating the exemplary display configuration of the "Territory Allocation" window on the display unit of the mobile terminal according to one or more embodiments of the present invention.

The operator selects and presses one or multiple buttons corresponding to one or multiple solder printing inspection devices 21 which the operator is to be in charge, among the plurality of option buttons 371 to 376 (as shown in FIG. 6). In the illustrated example of FIG. 6, the "$1^{st}$ device" and the "$2^{nd}$ device" (option buttons 371 and 372) are selected and pressed.

The operator subsequently presses the "Set" button 377 to settle the selected one or multiple solder printing inspection devices 21 as the territory which the operator is to be in charge. According to this embodiment, until the "Set" button 377 is pressed, another press of the selected button among the option buttons 371 to 376 deselects the pressed button. A press of the "Cancel" button 378 cancels the operation of territory allocation, closes the pop-up "Territory Allocation" window 356 and returns to the previous display.

Figure 7:
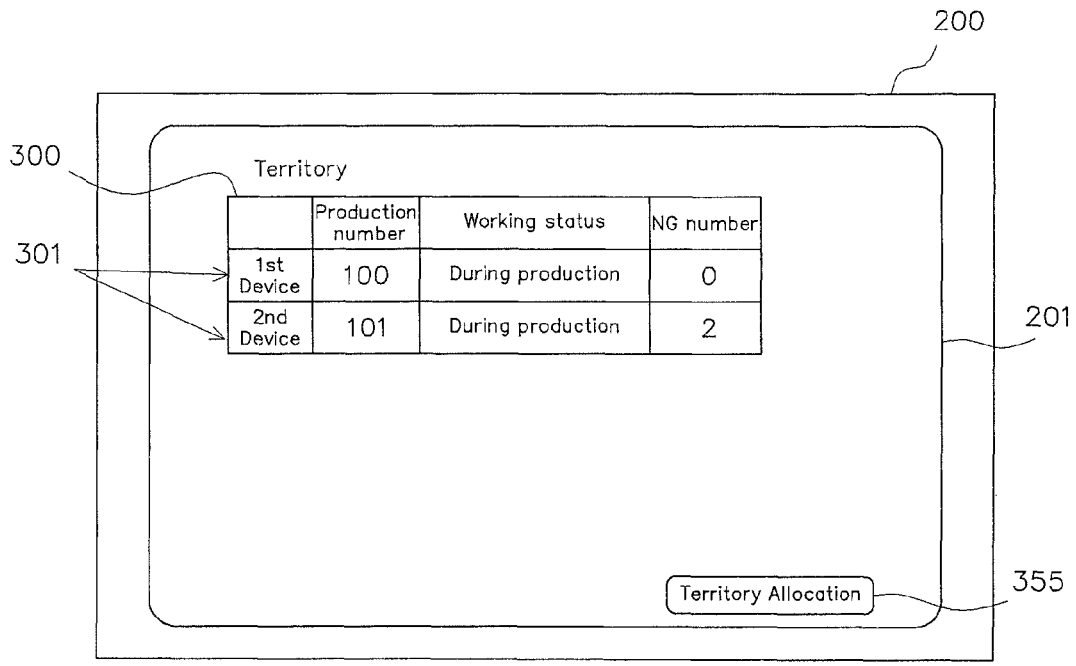
FIG. 7 is a diagram illustrating one exemplary display configuration of a "Territory" window on the display unit of the mobile terminal according to one or more embodiments of the present invention.

In response to a press of the "Set" button 377 to settle the territory in charge, the pop-up "Territory Allocation" window 356 is closed and a "Territory" window is displayed in place of the "Production Management Information" window on the display unit 201 of the mobile terminal 200 (as shown in FIG. 7).

According to this embodiment, the configuration of the "Territory" window is substantially similar to the configuration of the "Production Management Information" window described above. The "Territory" window displays a working status list 300 (excluding the "name of person in charge (operator)" based on the production management information, like the "Production Management Information" window. The working status list 300 of this window, however, includes only display fields 301 corresponding to the solder printing inspection devices 21 belonging to the set territory. In the illustrated example of FIG. 7, the "$1^{st}$ device" and the "$2^{nd}$ device" are set as the territory.

Simultaneously with the press of the "Set" button 377, the mobile terminal 200 sends information on the territory which the operator is to be in charge (hereinafter referred to as "territory information") to all the other mobile terminals 200 and each solder printing inspection device 21 belonging to the territory via the in-plant LAN. The specific contents of the territory information include information for identifying which operator is in charge of what solder printing inspection device 21, for example, the operator A is in charge of the "$1^{st}$ device" and the "$2^{nd}$ device".

When receiving the territory information, each of the other mobile terminals 200 stores the received territory information in its memory. The memory of each mobile terminal 200 accordingly stores data regarding the territories of all the operators who possess the mobile terminals 200 including its own mobile terminal 200.

In the meanwhile, when receiving the territory information, the main controller 61 of the solder printing inspection device 21 registers the mobile terminal 200 which has sent the territory information (i.e., the operator who possesses this mobile terminal 200), as the person in charge of the solder printing inspection device 21, in its own memory or the like.

The following describes, in detail, the operations of the monitor system 100 and the operating procedure of the mobile terminal 200 and its relevant displays in the event of the occurrence of a printed circuit board 1 determined as defective or in the event of the occurrence of any abnormality such as failure in a certain solder printing inspection device 21, with reference to the drawings.

Figure 8:
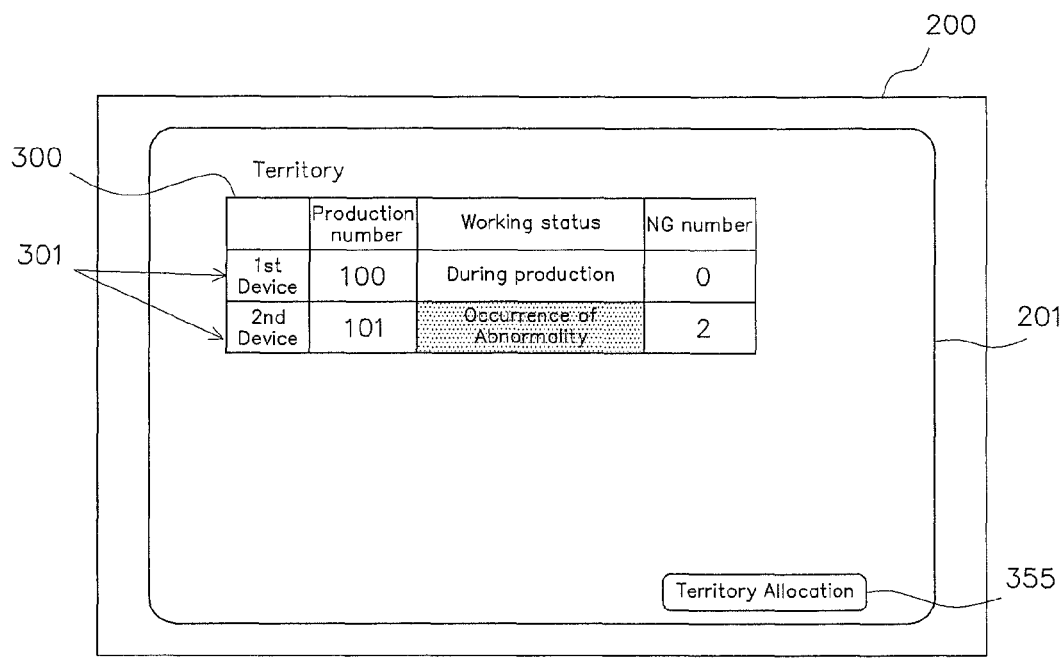
FIG. 8 is a diagram illustrating the exemplary display configuration of the "Territory" window on the display unit of the mobile terminal according to one or more embodiments of the present invention.
Figure 9:
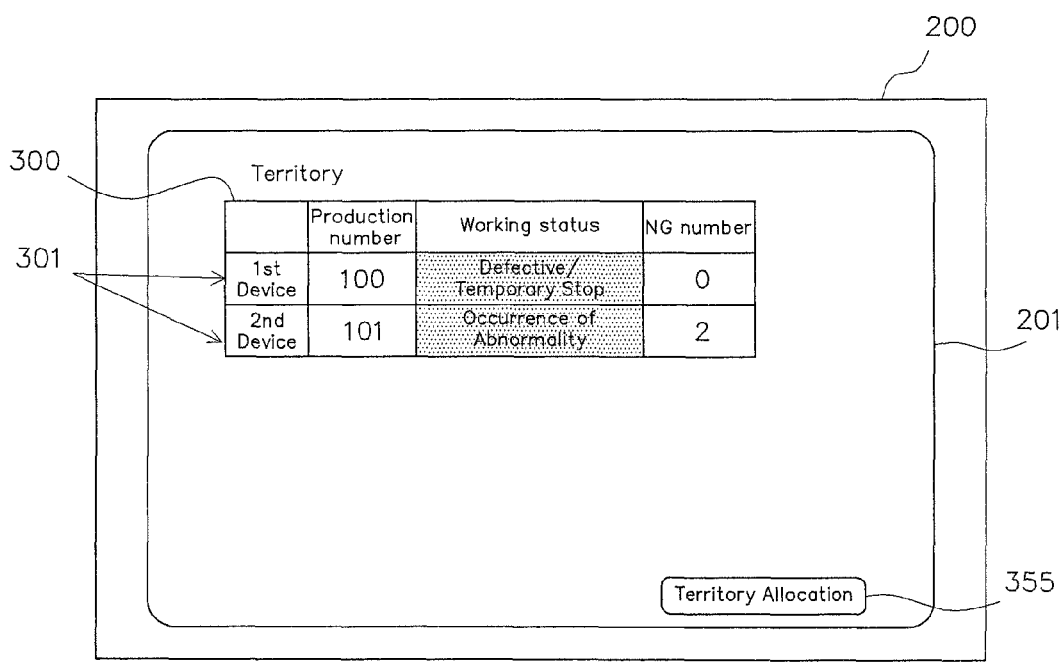
FIG. 9 is a diagram illustrating the exemplary display configuration of the "Territory" window on the display unit of the mobile terminal according to one or more embodiments of the present invention.

FIG. 8 shows a display on the mobile terminal 200 possessed by the person in charge of the "1$^{st}$" and "2$^{nd}$" solder printing inspection devices 21, in the event of the occurrence of an abnormality in the "2$^{nd}$ device", as a concrete example. FIG. 9 shows a display on the mobile terminal 200 in the event that the "1$^{st}$" solder printing inspection device 21 is temporarily stopped, in addition to the state of FIG. 8.

When an abnormality such as failure occurs in a certain solder printing inspection device 21 ("2$^{nd}$ device" in the illustrated example of FIG. 8 or the like), the setting of the working status flag described above is changed to the value "2" representing "occurrence of abnormality", and the certain solder printing inspection device 21 is temporarily stopped.

The certain solder printing inspection device 21 then sends information on the occurrence of abnormality in itself (abnormality occurrence information) to the mobile terminal 200 possessed by the person in charge (including the "temporary person in charge" described later).

When receiving the abnormality occurrence information, the mobile terminal 200 of the person in charge (including the "temporary person in charge") changes the display of the "Working status" item of the display field 301 corresponding to the solder printing inspection device 21 having the abnormality to the display of "Occurrence of Abnormality" in the displayed working status list 300 (as shown in FIG. 8). This notifies the person in charge of the occurrence of an event that requires "operator's specified operation" such as recovery operation.

In a concrete example, the display of "Occurrence of Abnormality" is provided in the "Working status" item of the display field 301 corresponding to the 2$^{nd}$ solder printing inspection device 21, and the color of the "Working status" item is changed from an initial color (for example, white) to a predetermined color representing "occurrence of abnormality" (for example, red) (as shown in FIG. 8).

The notified person in charge goes to the solder printing inspection device 21 having the abnormality ("2$^{nd}$ device" in the illustrated example of FIG. 8 or the like) and performs a required operation such as recovery operation with regard to the solder printing inspection device 21.

When a printed circuit board 1 is determined as defective in a certain solder printing inspection device 21 ("1st device" in the illustrated example of FIG. 9 or the like), the setting of the working status flag described above is changed to the value "1" representing "temporary stop", and the certain solder printing inspection device 21 is temporarily stopped. For example, this temporarily suspends the carry-out operation of the printed circuit board 1 by means of the mounting table 9 and temporarily suspends the carry-in operation of a new printed circuit board 1 and the inspection operation.

The certain solder printing inspection device 21 then sends information on the temporary stop of itself (temporary stop information), as well as the results of determination with regard to the printed circuit board 1 determined as defective (including the results of determination with regard to the respective lands 2 and the respective inspection items) and the inspection information including the image data and the results of measurement of the printed circuit board 1, to the mobile terminal 200 of the person in charge. According to this embodiment, the "temporary stop information" and the "abnormality occurrence information" of the solder printing inspection device 21 correspond to the status information (working information).

When receiving such information, the mobile terminal 200 of the person in charge (including the "temporary person in charge") changes the display of the "Working status" item of the display field 301 corresponding to the solder printing inspection device 21 at a temporary stop to the display of "Temporary Stop" in the displayed working status list 300 (as shown in FIG. 9). This notifies the person in charge of the occurrence of an event that requires "operator's specified operation" such as checking operation. The information such as "temporary stop" or "occurrence of abnormality" described above corresponds to the information on the event that requires the specified operation.

In a concrete example, the display of "Defective/Temporary Stop" is provided in the "Working status" item of the display field 301 corresponding to the 1st solder printing inspection device 21, and the color of the "Working status" item is changed from the initial color (for example, white) to a predetermined color representing "temporary stop" (for example, yellow) (as shown in FIG. 9).

The notified person in charge presses the relevant display field 301 including the above display of "Defective/Temporary Stop" ("Working status" item) and performs a checking operation with regard to the display field 301.

A press of the relevant display field 301 opens a "Defective Information" window on the display unit 201 of the mobile terminal 200 of the person in charge (as shown in FIG. 10).

The "Defective Information" window on the display unit 201 shows inspection information with regard to the printed circuit board 1 determined as defective, such as two-dimensional image data taken by the camera 52 and three-dimensional image data obtained by three-dimensional measurement. This notifies the person in charge of the details of the printed circuit board 1 determined as defective.

For example, the "Defective Information" window includes a main display frame 350 to display the entire printed circuit board 1, a plurality of sub-display frames 351 to provide an enlarged display of a place where a failure occurs or the like, and an inspection item list 352 to display various inspection items and their inspection results. A touch of the screen on the sub-display frame 351 shows three-dimensional image data or the like with regard to the cream solder 3 which is displayed as a two-dimensional image.

The person in charge who performs the checking operation with regard to the printed circuit board 1 determined as defective takes into account the two-dimensional image data and the three-dimensional image data or the like displayed in the "Defective Information" window and checks the validity of the determination result of the printed circuit board 1 (printing state of the cream solder 3) determined as defective.

The "Defective Information" window also includes an "OK" button 353 and an "NG button" 354 to give an instruction to the solder printing inspection device 21.

When determining that the determination result of the printed circuit board 1 as defective by the solder printing inspection device 21 is adequate, the person in charge presses the "NG" button 354 to approve the determination result by the solder printing inspection device 21.

In response to the press of the "NG" button 354, the mobile terminal 200 sends an approval signal (approval information) to the solder printing inspection device 21 at a temporary stop. When receiving the approval signal, the solder printing inspection device 21 cancels the temporary suspension of the carry-out operation of the printed circuit board 1 by means of the mounting table 9 and outputs a discharge signal for discharging the printed circuit board 1 to the branching device 31. The printed circuit board 1 determined as defective is accordingly discharged to the defective storage unit 41.

The solder printing inspection device 21 then changes the setting of the working status flag from the value "1" representing "temporary stop" to the value "0" representing "during production" and returns to the ordinary state.

In response to the press of the "NG" button 354, the display of the "NG" button 354 is changed to a "No Change" button (not shown) in the mobile terminal 200. This notifies the person in charge of completion of the required operation. The display on the display unit 201 of the mobile terminal 200 then changes from the "Defective Information" window to the "Production Management Information" window.

When determining that the determination result of the printed circuit board 1 as defective by the solder printing inspection device 21 is inadequate, on the other hand, the person in charge presses the "OK" button 353 to correct the determination result by the solder printing inspection device 21 to determination as non-defective.

In response to the press of the "OK" button 353, the mobile terminal 200 sends a correction signal (correction information) to the solder printing inspection device 21 at a temporary stop. When receiving the correction signal, the solder printing inspection device 21 cancels the temporary suspension of the carry-out operation of the printed circuit board 1 by means of the mounting table 9 and performs a correction process to correct the production management information described above. For example, the correction process subtracts the value of the defective count number by one and adds the value of the non-defective count number by one. The solder printing inspection device 21 then changes the setting of the working status flag from the value "1" representing "temporary stop" to the value "0" representing "during production" and returns to the ordinary state.

In response to the press of the "OK" button 353, the display of the "OK" button 353 is changed to a "Changed" button (not shown) in the mobile terminal 200. This notifies the person in charge of completion of the required operation. The display on the display unit 201 of the mobile terminal 200 then changes from the "Defective Information" window to the "Production Management Information" window.

The following describes, in detail, the operating procedure of the mobile terminal 200 and its relevant displays when each operator changes the own territory in charge, with reference to the drawings. According to this embodiment, the function to perform the following series of processing corresponds to the territory setting canceller.

For example, when the person in charge of the "1$^{st}$ device" and the "2$^{nd}$ device" encounters a problem in the "2$^{nd}$ device" such as a failure that requires a long time to be solved as shown in FIG. 9, the person in charge is allowed to take an action for excluding the "1$^{st}$ device" from the own territory.

Figure 11:
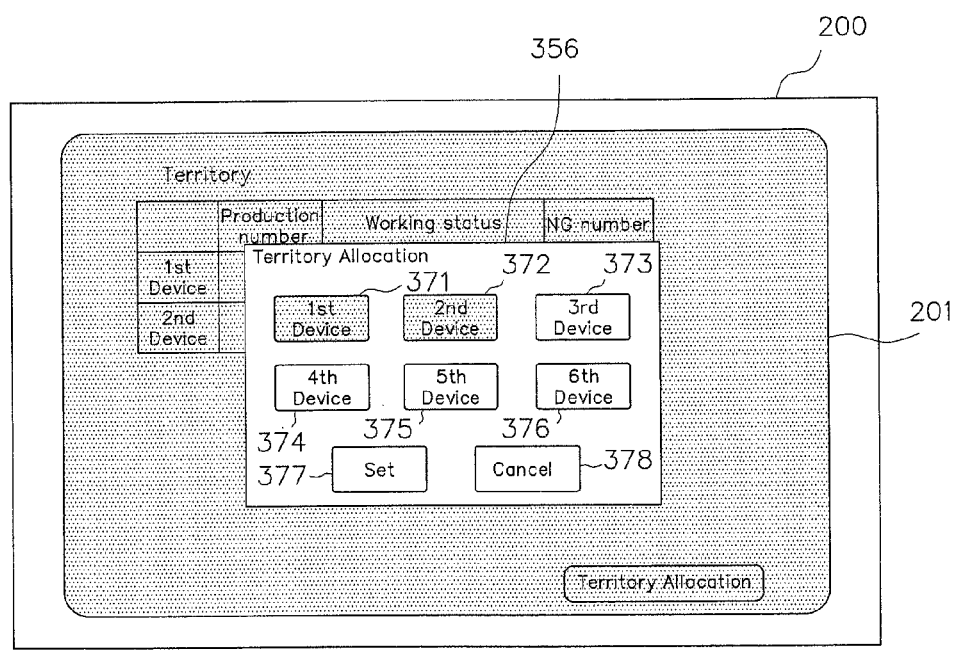
FIG. 11 is a diagram illustrating another exemplary display configuration of the "Territory Allocation" window on the display unit of the mobile terminal according to one or more embodiments of the present invention.

In this case, the person in charge presses the "Territory Allocation" button 355. The "Territory Allocation" window 356 described above is then pop-up displayed over the "Territory" window on the display unit 201 of the mobile terminal 200 of the person in charge (as shown in FIG. 11).

Figure 12:
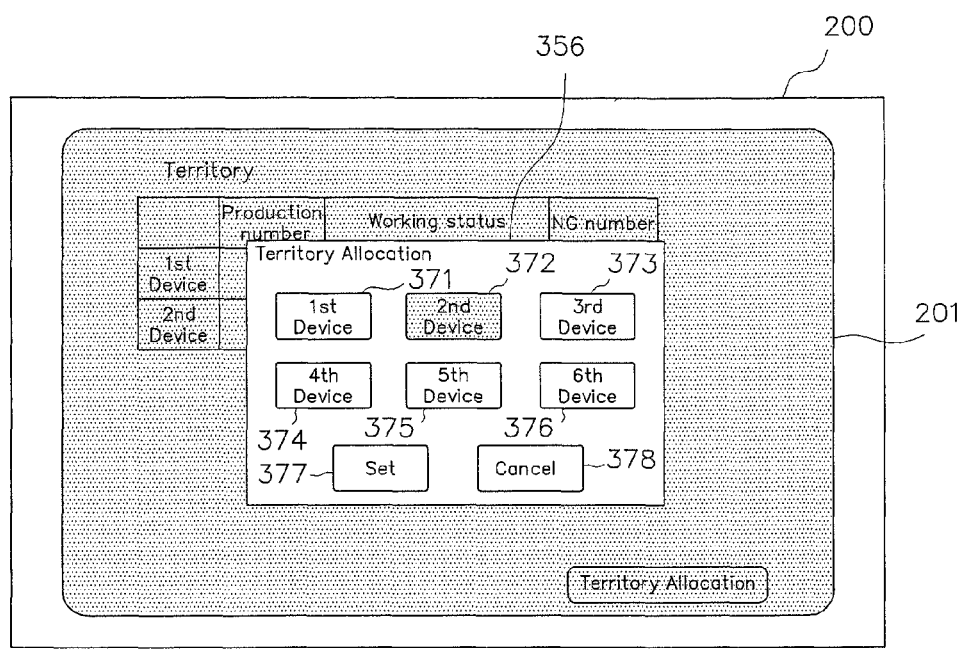
FIG. 12 is a diagram illustrating the exemplary display configuration of the "Territory Allocation" window on the display unit of the mobile terminal according to one or more embodiments of the present invention.

The person in charge then presses buttons corresponding to one or multiple solder printing inspection devices 21 as the object to be excluded from the own territory among the one or multiple option buttons 371 to 376 selected in advance to cancel the selection (as shown in FIG. 12). In the illustrated example of FIG. 11, the "1$^{st}$ device" and the "2$^{nd}$ device" (option buttons 371 and 372) are selected. In the illustrated example of FIG. 12, the "1st device" (option button 371) is pressed to cancel the selection, and only the "2$^{nd}$ device" (option button 372) is continuously selected.

The person in charge subsequently presses the "Set" button 377 to settle the exclusion of the one or multiple solder printing inspection devices 21 subjected to the above cancellation of selection from the own territory.

Figure 13A:
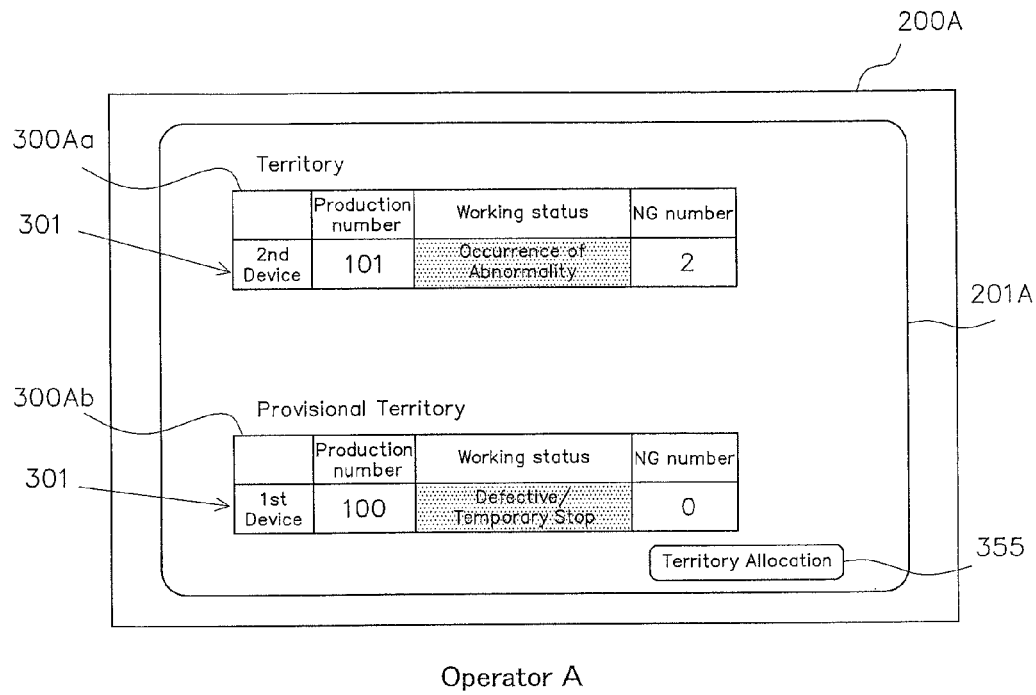
FIGS. 13A and 13B are diagrams illustrating one exemplary display configuration in a plurality of mobile terminals according to one or more embodiments of the present invention when a certain person in charge excludes a specific item from the person's own territory.

When the "Set" button 377 is pressed to settle a new territory, the "Territory Allocation" window 356 is closed and a new "Territory" window is opened on the display unit 201 of the mobile terminal 200 (as shown in FIG. 13A).

Simultaneously with the press of the "Set" button 377, the mobile terminal 200 sends new territory information on the territory which the operator is newly to be in charge to all the other mobile terminal 200 via the in-plant LAN. The mobile terminal 200 also sends territory cancellation information regarding cancellation of the territory to the solder printing inspection device 21 that is excluded from the territory.

When receiving the territory information, each of the other mobile terminals 200 updates the contents of the data regarding the respective operators' territories stored in its own memory. In the meanwhile, when receiving the territory cancellation information, the main controller 61 of the solder printing inspection device 21 excludes the mobile terminal 200 which has sent the territory cancellation information (i.e., the operator who possesses the mobile terminal 200) from the person in charge and registers all the operators who possess the mobile terminals 200 as temporary persons in charge in its own memory or the like.

Each mobile terminal 200 then determines whether at least one person in charge is set for each solder printing inspection device 21, based on the contents of the data regarding the respective operators' territories stored in its own memory. According to this embodiment, the function of performing such determination corresponds to the territory identifier.

When there is any solder printing inspection device 21 without the person in charge, each mobile terminal 200 forcibly sets the solder printing inspection device 21 as a provisional territory in relation to its own specified territory. According to the example, the function of such setting corresponds to the provisional territory setter.

Based on such setting, the "Territory" window displayed on the display unit 201 of the mobile terminal 200 includes a working status list 300 of the "provisional territory" in addition to the working status list 300 of the "territory". The working status list 300 of the "provisional territory" includes only a display field 301 corresponding to the solder printing inspection device 21 belonging to the forcibly set provisional territory.

In a concrete example, as shown in FIGS. 13(*a*) and 13(*b*), when an operator A who is in charge of the "1st device" and the "2nd device" excludes the "1st device" from the operator A's own territory, a display field 301 with regard to the "1st device" is excluded from a working status list 300Aa of the "territory" in the "Territory" window displayed on a display unit 201A of a mobile terminal 200A possessed by the operator A, and only a display field 301 with regard to the "2$^{nd}$ device" is left in the working status list 300Aa. A working status list 300Ab of the "provisional territory" (display field 301 with regard to the "1st device") is newly displayed below the working status list 300Aa. In the "Territory" window displayed on a display unit 201B of a mobile terminal 200B possessed by an operator B who is in charge of the "3$^{rd}$ device" and the "4th device", on the other hand, a working status list 300Bb of the "provisional territory" (display field 301 with regard to the "1st device") is newly displayed below a working status list 300Ba of the operator B's own "territory".

Figure 13B:
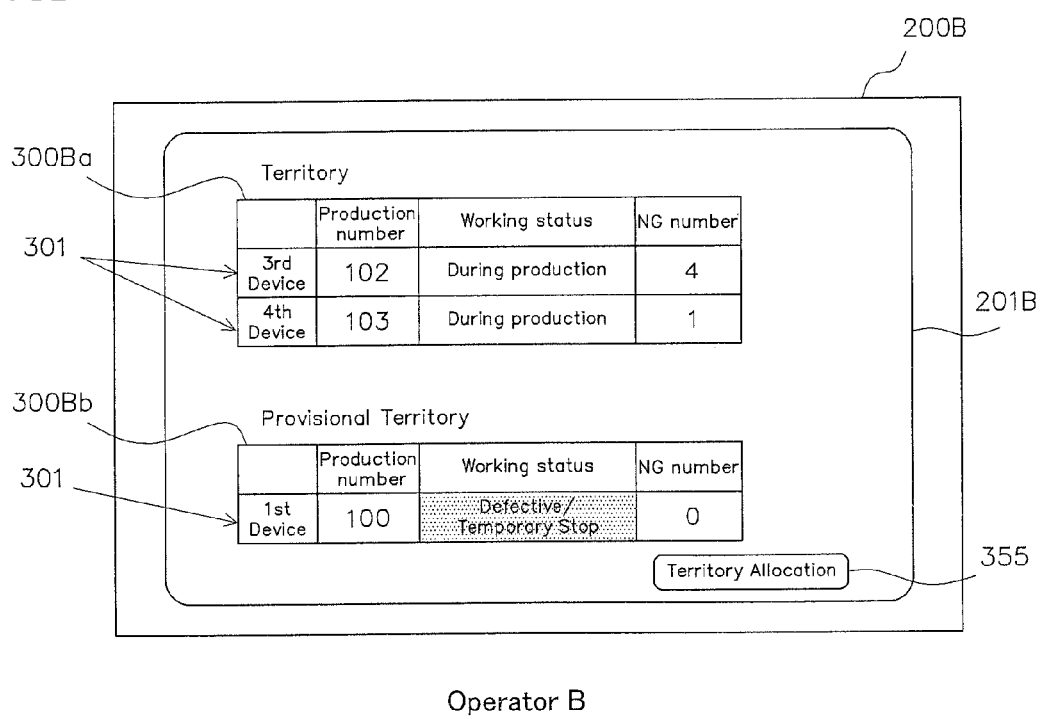

When a certain operator (for example, the operator B shown in FIG. 13B) incorporates an operation with regard to the "provisional territory" (for example, operation with regard to the "1$^{st}$ device" shown in FIGS. 13A and 13B) into the operator's own "territory", the certain operator presses the "Territory Allocation" button 355 to open the "Territory Allocation" window 356 and incorporate the operation into the operator's own territory by the same procedure as that described above. When the operation with regard to the "provisional territory" is incorporated into the certain operator's own "territory", the display field 301 with regard to this operation is excluded from the working status list 300 of the "provisional territory" displayed on the display units 201 of the mobile terminals 200 of all the operators. When there is no operation with regard to the "provisional territory", the working status list 300 itself of the "provisional territory" disappears.

When a certain operator (for example, the operator B shown in FIG. 13B) performs an operation with regard to the "provisional territory" (for example, operation with regard to the "1$^{st}$ device" shown in FIGS. 13A and 13B) without incorporating the operation into the operator's own "territory", on the other hand, the certain operator presses the display field 301 in the working status list 300 of the "provisional territory" to settle the operation as the operation to be performed by the certain operator.

When the certain operator presses the display field 301 in the working status list 300 of the "provisional territory" to select the operation with regard to the display field 301 as the operation to be performed by the certain operator, the mobile terminal 200 sends selection information showing that the certain operator selects the operation with regard to the display field 301 to all the other mobile terminals 200 via the in-plant LAN.

In a concrete example, when the operator B shown in FIG. 13B presses and selects the display field 301 corresponding to the "1$^{st}$" solder printing inspection device 21 displayed as "Defective/Temporary Stop" in the working status list 300Bb of the "provisional territory", the selected display field 301 is changed to a specific color (for example, green) representing "during operation".

When receiving the above selection information, each of the other mobile terminals 200 changes the display in a display field 301 corresponding to the display field 301 selected in the mobile terminal 200 as the source that has sent the selection information to the display representing settlement of selection by the certain operator, in its own working status list 300 of the "provisional territory".

In a concrete example, when receiving the above selection information from the mobile terminal 200B of the operator B, the mobile terminal 200A of the operator A shown in FIG. 13A grays out a display field 301 corresponding to the display field 301 selected by the operator B, in its own working status list 300Ab of the "provisional territory". This notifies the operator A of the fact that another operator is in charge of the operation with regard to the display field 301. Graying out the display field 301 makes the display field 301 non-selectable by the operator A.

When the certain operator selects a checking operation with regard to the display field 301 displayed as "Defective/Temporary Stop" in the working status list 300 of the "provisional territory" as the operation to be performed by the certain operator, the display on the mobile terminal 200 of the certain operator is changed to the "Defective Information" window described above.

As described above in detail, according to this embodiment, in the event of defective determination in the solder printing inspection device 21 as the monitoring object, the information regarding the defective determination is sent to the mobile terminal 200 possessed by the person in charge (including temporary person in change). The person in charge receiving this information then performs the checking operation via the mobile terminal 200 to check the validity of the determination result with regard to the printed circuit board 1 determined as defective. An instruction for the operation based on the result of the validity check is sent to the solder printing inspection device 21 in which conveyance of the printed circuit board 1 is temporarily suspended. When the correction information for correcting the defective determination to non-defective determination is sent from the mobile terminal 200 to the solder printing inspection device 21, the solder printing inspection device 21 corrects the defective determination to non-defective determination and cancels the temporary suspension of conveyance of the printed circuit board 1.

In the event of the occurrence of a defective in a certain solder printing inspection device 21, the above configuration allows the person in charge to perform the checking operation described above via the mobile terminal 200 without actually going to the solder printing inspection device 21. This saves the time when the person in charge goes to the solder printing inspection device 21 and shortens the time when the solder printing inspection device 21 is at a stop. As a result, this improves the working efficiency and the operation rate of the inspection device and thereby the operation rate of the production line, thus enhancing the productivity.

The above configuration enables each operator to use the own mobile terminal 200 to set, change and cancel the territory of the operation to be performed by the operator. Compared with a conventional configuration that, for example, a management device allocates the respective operations based on the respective operators' territories stored in advance in the management device, this configuration enables each operator to understand the own status and the other operators' statuses and flexibly respond to the status of the production field or the like changing momently due to various reasons.

As a result, this ensures efficient operation and management of the production lines 10 or the like and improves the productivity.

Additionally, when there is any solder printing inspection device 21 that does not belong to the territory of any operator, the operation with regard to the solder printing inspection device 21 is set as a provisional territory in all the operators' mobile terminals 200. This eliminates the likelihood that there is any solder printing inspection device 21 that does not belong to the territory of any operator.

The invention is not limited to the description of the above embodiment but may be implemented as described below. As will be understood, the invention may also be implemented by various other applications and modifications that are not specifically described herein.

(a) In the above embodiment, the solder printing inspection device 21 as an exemplary inspection device is specified as the equipment to be monitored by the monitor system 100. The equipment to be monitored by the monitor system 100 is, however, not limited to this embodiment. For example, another equipment such as the cream solder printing device 11, the component mounting device 12, the reflow device 13, the mounting state inspection device 22 or the soldering state inspection device 23 may be specified as the monitoring object.

In the configuration including a plurality of different equipment (for example, cream solder printing device 11, component mounting device 12, reflow device 13, solder printing inspection device 21, mounting state inspection device 22 and soldering state inspection device 23) like the above embodiment, multiple types of equipment may be specified as the monitoring object.

One or more embodiments of the invention may be applied to a monitor system for production lines of PTP sheets or production lines of battery elements, instead of the production lines 10 of printed circuit boards 1 described in the above embodiment.

(b) The configuration of the above embodiment monitors the "occurrence of defective" and the "occurrence of any abnormality such as failure" as the "status of equipment" and in the event of such occurrence, performs the "checking operation of the inspection object" or the "recovery operation" as the "specified operation". The "status of equipment" to be monitored and the "specified operation" required on the basis of the monitoring result are not limited to those of the above embodiment. For example, one modified configuration may monitor the remaining amount or the shortage of a predetermined material used in the equipment and perform a material supply operation or the like based on the monitoring result.

(c) In the above embodiment, the smartphone and the tablet PC are described as examples of the mobile terminal 200. This is, however, not restrictive, and an existing cell phone or notebook PC may be employed as the mobile terminal 200. In place of the touch panel, a standard liquid crystal display or the like may be employed as the display unit and a mouse and a keyboard or the like may be employed as the input unit.

(d) In the above embodiment, the mobile terminal 200 of the person in charge sends the data request signal to each solder printing inspection device 21 and obtains the production management information. This configuration is, however, not restrictive. According to a modified configuration, each solder printing inspection device 21 may send the production management information to the mobile terminal 200 of the person in charge at regular intervals.

According to another modified configuration, a management server may be provided to be connected with the respective solder printing inspection devices 21 in a communicable manner via the in-plant LAN and consolidate the management of the production management information of the respective solder printing inspection devices 21. The mobile terminal 200 of the person in charge may obtain the production management information of each solder printing inspection device 21 from the management server.

(e) According to the configuration of the above embodiment, when the territory in charge (including provisional territory) is set, the mobile terminal 200 sends the data request signal to only the solder printing inspection devices 21 belonging to the territory in charge and obtains the production management information of only the solder printing inspection devices 21.

This is, however, not restrictive. According to a modified configuration, even when the territory in charge is set, the mobile terminal 200 may obtain the production management information of all the solder printing inspection devices 21 and display the production management information with regard to only the solder printing inspection devices 21 belonging to the territory in charge on the display unit 201.

(f) According to the configuration of the above embodiment, even when the working status of each solder printing inspection device 21 is not "temporary stop" or "occurrence of abnormality" but is "during production" in the ordinary state, the mobile terminal 200 obtains the production management information from each solder printing inspection device 21 at regular intervals and displays the working status of each solder printing inspection device 21 in the working status list 300. This is, however, not restrictive. According to a modified configuration, the working status may be notified at least when the working status of the solder printing inspection device 21 is changed to "temporary stop" or "occurrence of abnormality".

(g) In the above embodiment, the territory which each operator is in charge is set for each equipment (solder printing inspection device 21). This is, however, not restrictive, and the territory may be set for each operation type. For example, an operator A may be in charge of the "checking operation of the inspection object" accompanied with the "occurrence of a defective", and an operator B may be in charge of the "recovery operation" accompanied with the "occurrence of any abnormality such as failure".

(h) The network configuration (in-plant LAN) is not limited to the above embodiment. For example, the communication controllers 66 of the respective solder printing inspection devices 21 are connected by the LAN cables (wired LAN) in the above embodiment, but may be connected by a wireless LAN.

The respective solder printing inspection devices 21 may not necessarily provide a network connection, but the requirement may be that a communication line is provided to allow for at least data transmission and reception between the respective solder printing inspection devices 21 and the mobile terminals 200. The communication line may not be necessarily an exclusive network established in the plant but may be a public mobile communication network or a public wireless LAN.

In the above embodiment, each solder printing inspection device 21 comprises the communication controller 66 and the tower light 67. This configuration is, however, not restrictive, but these functions may be externally provided outside of the solder printing inspection device 21. Each solder printing device 21 may not necessarily comprise these functions as the one-to-one basis.

The above embodiment does not specifically describe the wireless communication standard employed for the wireless LAN. Any wireless communication standard such as Wi-Fi (registered trademark) or Bluetooth (registered trademark) may be employed as long as it allows for at least data transmission and reception by wireless communication.

(i) According to the configuration of the above embodiment, the working status list 300 of the "Territory" window on each mobile terminal 200 includes display fields 301 corresponding to only the solder printing inspection devices 21 belonging to the territory in charge and does not include display fields 301 corresponding to the other solder printing inspection devices 21. The display configuration of the "Territory" window is, however, not limited to this embodiment.

For example, the display field 301 corresponding to each solder printing inspection device 21 belonging to the territory in charge may be shown in a predetermined configuration (for example, in a luminescent color) to allow the operator to recognize that the corresponding solder printing inspection device 21 is included in the territory in charge. The display field 301 corresponding to each solder printing inspection device 21 out of the territory in charge may be shown in a specified configuration (for example, grayed out) to allow the operator to recognize that the corresponding solder printing inspection device 21 is not included in the territory in charge.

(j) According to the configuration of the above embodiment, each operator uses the own mobile terminal 200 to freely set the own territory in charge and freely exclude a specific solder printing inspection device 21 from the own territory in charge. This is, however, not restrictive. According to a modified configuration, a specified manager may set, change and cancel the territory of each operator, in response to a request from the operator.

(k) A plurality of operators may specify one identical solder printing inspection device 21 in an overlapping manner to be included in their own territories in charge, although this is not specifically described in the above embodiment.

(l) According to the configuration of the above embodiment, when there is any solder printing inspection device 21 without the person in charge, each mobile terminal 200 forcibly sets the solder printing inspection device 21 as a provisional territory in relation to its own specified territory. This is, however, not restrictive. According to a modified configuration, a specified manager may appoint a certain operator as the person in charge without allowing each mobile terminal 200 to automatically set a provisional territory.

When a certain operator excludes a specific solder printing inspection device 21 from the operator's own territory in charge, the certain operator may appoint another specific operator to transfer the authority and power with regard to the territory.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 printed circuit board
3 cream solder
10 production line
21 solder printing inspection device
61 main controller
100 monitor system
200 mobile terminal
201 display unit (display)
300 working status list
301 display field
355 "Territory Allocation" button
356 "Territory Allocation" window
371-376 option buttons
377 "Set" button
378 "Cancel" button

What is claim is:

1. A monitor system for monitoring a status of one or more equipment, the monitor system comprising:
   a plurality of mobile terminals respectively operated by a plurality of operators, wherein
   each of the plurality of mobile terminals comprises:
      a communicator that receives status information with regard to the status of the equipment via a communication line;
      a display that displays, when the status according to the status information received from one of the mobile terminals indicates that the equipment requires a specified operation, information showing that the specified operation is required; and
      a territory setter that sets a territory in which one or more operations for the equipment to be performed by the operator of the each of the plurality of mobile terminals,
   when the specified operation is to be performed in the territory, the display displays the information showing that the specified operation is required in the territory,
   the communicator establishes communication with another mobile terminal via the communication line,
   when the operator of the each of the plurality of mobile terminals sets the territory, the communicator sends territory information representing the territory set by the operator to the other mobile terminal,
   the each of the plurality of mobile terminals further comprises:
      a territory identifier that determines whether there is an operation that does not belong to the territory of any of the operators, based on the territory information received from the other mobile terminal; and
      a provisional territory setter that sets, when there is the operation that does not belong to the territory of any of the operators, a provisional territory in which the operation that does not belong to the territory of any of the operators is to be performed by the operator of the each of the plurality of mobile terminals, and
   when the specified operation is to be performed in the provisional territory, the display displays the information showing that the specified operation is required in the provisional territory.

2. The monitor system according to claim 1, further comprising:
   a territory setting canceller that excludes the specified operation from the one or more operations to be performed in the territory.

3. The monitor system according to claim 2, wherein the communicator receives the status information with regard to the status of the equipment in the territory.

4. The monitor system according to claim 3, wherein the display
   does not display the information for the equipment that is not in the territory, or
   displays the information showing that the specified operation is not required for the equipment that is not in the territory.

5. The monitor system according to claim 2, wherein the display
   does not display the information for the equipment that is not in the territory, or
   displays the information showing that the specified operation is not required for the equipment that is not in the territory.

6. The monitor system according to claim 1, wherein the communicator receives the status information with regard to the status of the equipment in the territory.

7. The monitor system according to claim 6, wherein the display
   does not display the information for the equipment that is not in the territory, or
   displays the information showing that the specified operation is not required for the equipment that is not in the territory.

8. The monitor system according to claim 1, wherein the display
    does not display the information for the equipment that is not in the territory, or
    displays the information showing that the specified operation is not required for the equipment that is not in the territory.

\* \* \* \* \*